United States Patent
Engelhaupt et al.

(10) Patent No.: US 8,052,860 B1
(45) Date of Patent: Nov. 8, 2011

(54) ELECTROCHEMICAL AND MECHANICAL POLISHING AND SHAPING METHOD AND SYSTEM

(75) Inventors: Darell E. Engelhaupt, Madison, AL (US); Mikhail V. Gubarev, Huntsville, AL (US); William David Jones, Huntsville, AL (US); Brian D. Ramsey, Huntsville, AL (US); Carl M. Benson, Huntsville, AL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 997 days.

(21) Appl. No.: 11/957,051

(22) Filed: Dec. 14, 2007

Related U.S. Application Data

(60) Provisional application No. 60/914,076, filed on Apr. 26, 2007.

(51) Int. Cl.
*B23H 3/00* (2006.01)
(52) U.S. Cl. ........ 205/641; 205/642; 205/643; 205/646; 205/651
(58) Field of Classification Search ............... None
See application file for complete search history.

(56) References Cited

OTHER PUBLICATIONS

De Silva et al. teaching "Precision ECM by Process Characteristic Modelling", Annals of the CIRP, 2000, v. 49, pp. 151-155.*
Hocheng "The application of a turning tool as the electrode in electropolishing", Journal of Materials Processing Technology, 2002, v. 120, pp. 6-12.*
Hocheng et al. "A material removal analysis of electrochemical machining using flat-end cathode", Journal of Materials Processing Technology, 2003, v. 140, pp. 264-268.*
Bhattacharyya et al. "Experimental investigation on the influence of electrochemical machining parameters on machining rate and accuracy in micromachining domain", International Journal of Machine Tools & Manufacture, 2003, v. 43, pp. 1301-1310.*

* cited by examiner

*Primary Examiner* — Yelena G Gakh
(74) *Attorney, Agent, or Firm* — Peter J. Van Bergen; James J. McGroary

(57) ABSTRACT

A method and system are provided for the shaping and polishing of the surface of a material selected from the group consisting of electrically semi-conductive materials and conductive materials. An electrically non-conductive polishing lap incorporates a conductive electrode such that, when the polishing lap is placed on the material's surface, the electrode is placed in spaced-apart juxtaposition with respect to the material's surface. A liquid electrolyte is disposed between the material's surface and the electrode. The electrolyte has an electrochemical stability constant such that cathodic material deposition on the electrode is not supported when a current flows through the electrode, the electrolyte and the material. As the polishing lap and the material surface experience relative movement, current flows through the electrode based on (i) adherence to Faraday's Law, and (ii) a pre-processing profile of the surface and a desired post-processing profile of the surface.

24 Claims, 2 Drawing Sheets

ELECTROCHEMICAL AND MECHANICAL POLISHING AND SHAPING METHOD AND SYSTEM

CROSS-REFERENCES TO RELATED APPLICATIONS

This application claims the benefit of U.S. Provisional Application No. 60/914,076, filed on Apr. 26, 2007.

ORIGIN OF THE INVENTION

The invention described herein was made in the performance of work under a NASA contract and by an employee of the United States Government and is subject to the provisions of Public Law 96-517 (35 U.S.C §202) and may be manufactured and used by or for the Government for governmental purposes without the payment of any royalties thereon or therefore. In accordance with 35 U.S.C §202, the contractor elected not to retain title.

BACKGROUND OF THE INVENTION

1. Field of the Invention

This invention relates to the concurrent shaping and polishing of electrically-conductive materials. More specifically, the invention is method and system for deterministically shaping and polishing an electrically-conductive material by employing electrochemical and mechanical shaping/polishing at the same time.

2. Description of the Related Art

Optical component fabrication using metals or ceramic materials involves many grinding and/or machining plus polishing steps to achieve the proper form to the tolerances required by imaging or photonic focusing instruments. Conventional manufacturing methods require many days or even months of precise shaping and polishing to improve selected areas of the component. This improvement comes from precise measurements and, usually, manual operations to apply additional polishing to the measured discrepancy.

More modern methods used to overcome the extreme obstacles of manufacturing precise optics (e.g., those used in space exploration or short wavelength light imaging) include selective ion plasma etching and magnetorheological polishing with ferro-fluids in a magnetic field. While both techniques can be accomplished with computer control, the methods are extremely costly and equipment intensive.

Ion plasma etching requires placement of the optical component in a vacuum chamber, expensive radio-frequency amplifiers, and vacuum compatible controllers to selectively remove "high" areas from the component. In order to measure the work progress, the vacuum must be released and the re-established thereby increasing processing time. Magnetorheological polishing with ferro-fluids in a magnetic field is precise, but requires additional loading on the part thereby limiting the minimum stiffness of delicate lightweight optical components. Further, these two deterministic methods require capital investments of hundreds of thousands of dollars, special operator training, and special facilities considerations. In addition, the size and/or geometry of the components that can be processed is limited to the size/geometry of the equipment.

Another polishing process known as chemical mechanical polishing (CMP) is used to assist in the planarization of flat wafers. In this process, corrosive chemicals are mixed with polishing slurries to aid in substrate material removal by increasing the rate and in some cases improving the surface finish. The oxidation portion of the corrosion reaction is provided by an oxidizing substance such as hydrogen peroxide, nitric acid, perchloric acid, or ammonium persulfate, etc. Unfortunately, most of these oxidants are very hazardous. These processes are used with flat wafers, particularly silicon, for improved planarization. More recent processes have included electrochemical etching superimposed upon a chemical mechanical planarization process. However, no deterministic shaping is provided by these processes.

SUMMARY OF THE INVENTION

Accordingly, it is an object of the present invention to provide a system and method of concurrently shaping and polishing a material.

Another object of the present invention is to provide a deterministic system and method of shaping and polishing an electrically conductive or semi-conductive material.

Still another object of the present invention is to provide high quality deterministic shaping and polishing system that is relatively inexpensive and simple to use.

Other objects and advantages of the present invention will become more obvious hereinafter in the specification and drawings.

In accordance with the present invention, a method and system are provided for the shaping and polishing of the surface of a material selected from the group consisting of electrically semi-conductive and conductive materials. An electrically non-conductive polishing lap incorporates a conductive electrode such that, when the polishing lap is placed on the material's surface, the electrode is placed in spaced-apart juxtaposition with respect to the material's surface. A liquid electrolyte is disposed between the material's surface and the electrode. The electrolyte is formulated to provide etching of the material only when a specific current is applied. The electrolyte has an electrochemical stability constant such that cathodic material deposition on the electrode is not supported when a current flows through the electrode, the electrolyte and the material. As the polishing lap and the material surface experience relative movement, current is caused to flow through the electrode. The current is adjusted based on (i) adherence to Faraday's Law, and (ii) a pre-processing profile of the surface and a desired post-processing profile of the surface.

BRIEF DESCRIPTION OF THE DRAWING(S)

Other objects, features and advantages of the present invention will become apparent upon reference to the following description of the preferred embodiments and to the drawings, wherein corresponding reference characters indicate corresponding parts throughout the several views of the drawings and wherein.

Figure 3:
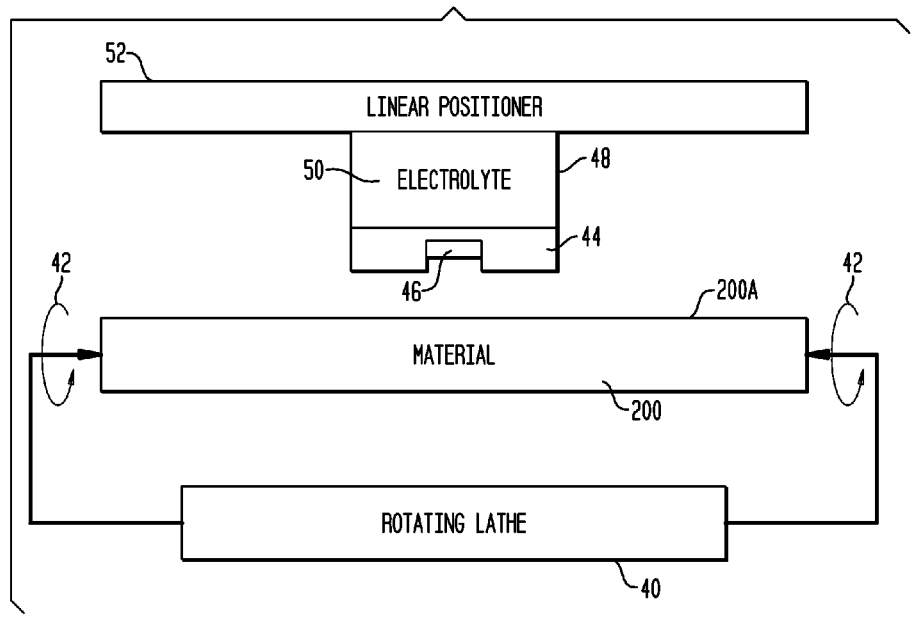
Figure 4:
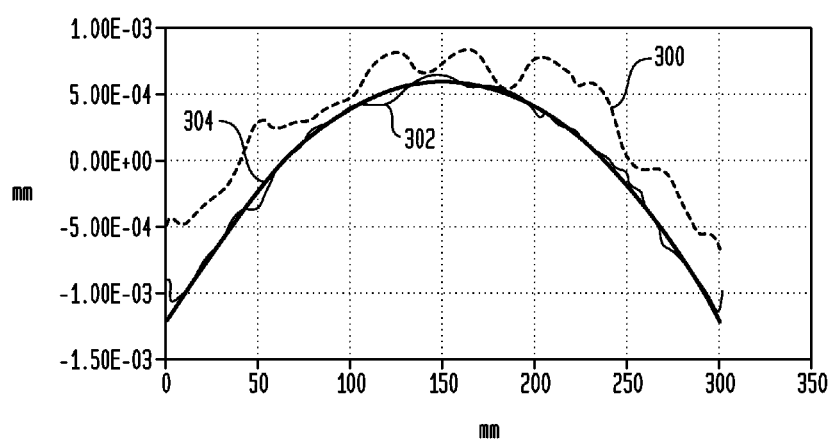

FIG. 3 is a schematic view of a shaping and polishing system in which the material being shaped/polished rotates as a polishing lap is moved therealong in accordance with another embodiment of the present invention; and FIG. 4 depicts a desired profile curve for a component and profile curves of the component resulting from only mechanical polishing and from deterministic shaping and polishing in accordance with the present invention.

DESCRIPTION OF THE PREFERRED EMBODIMENT(S)

Figure 1:
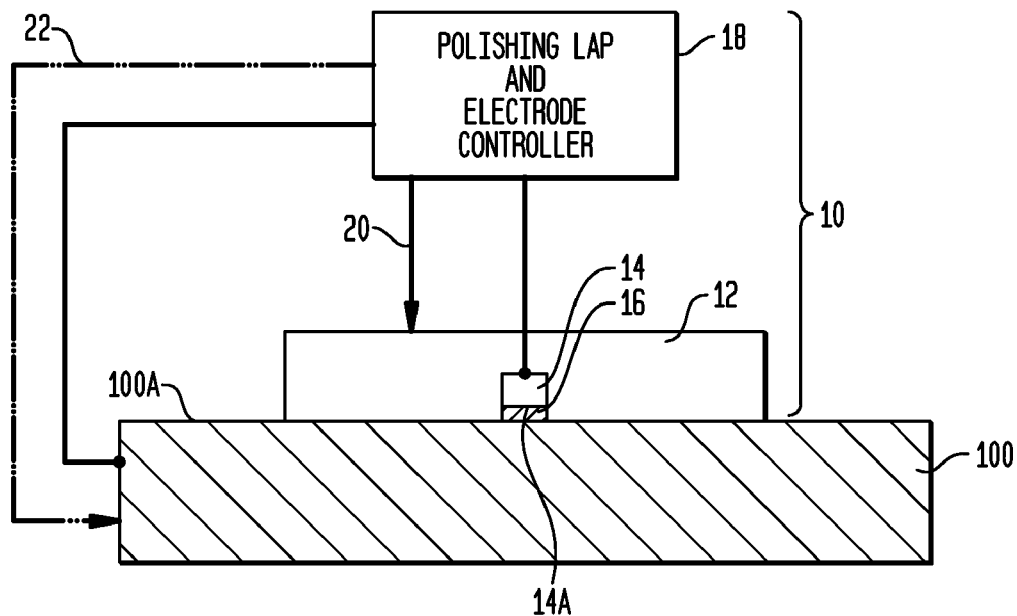
FIG. 1 is a schematic view of a deterministic shaping and polishing system in accordance with the present invention.

Referring now to the drawings and more particularly to FIG. 1, a combination electrochemical and mechanical deterministic shaping and polishing system in accordance with the present invention is shown and is referenced generally by numeral 10. System 10 is used to form (or shape) and finish (or polish) the surface 100A of a material 100 that is either electrically conductive or semi-conductive. Material 100 can be a single element or an alloy having single or multiple phases of hardness. Indeed, a great advantage of the present invention is its ability to deterministically shape and polish a multiple phase material. For ease of illustration, surface 100A is a generally planar. However, it is to be understood that the present invention can be readily adapted and used to shape and polish material surfaces that are not planar.

The portion of shaping and polishing system 10 that performs the shaping and polishing "work" includes a polishing lap 12, an electrode 14, and an electrolyte 16. It is to be understood that these elements are shown in a simple schematic fashion to provide an understanding of the present invention and that actual constructions incorporating these elements can vary without departing from the scope of the present invention.

Polishing lap 12 is any electrically non-conductive material or structure capable of mechanically shaping and polishing surface 100A when (i) polishing lap 12 is in physical contact with surface 100A that has been wetted with a polishing media (not shown for clarity of illustration), and (ii) there is a relative movement between polishing lap 12 and surface 100A. The choice of polishing media may be selected from fixed or free abrasives known within the ordinary skill in the art. The polishing media could be mixed in with electrolyte 16. The choice of materials for polishing lap 12 are within the ordinary skill in the art and not limitations of the present invention.

The relative movement between polishing lap 12 and surface 100A is brought about by a polishing lap and electrode controller 18 which also controls the positioning of polishing lap 12 on surface 100A as will be explained further below. For example, controller 18 could move (e.g., rotate, slide, translate, vibrate, etc.) polishing lap 12 relative to a stationary material 100/surface 100A as indicated by control arrow 20. Alternatively, controller 18 could move (e.g., rotate, slide, vibrate, etc.) material 100/surface 100A relative to a stationary polishing lap 12 as indicated by dashed-line control arrow 22. Still further, controller 18 could bring about movement of both polishing lap 12 and material 100/surface 100A where such movement could occur simultaneously or alternately without departing from the scope of the present invention.

In general, electrode 14 is positioned to be in a spaced-apart juxtaposition with surface 100A while being within the confines of polishing lap 12. For example, electrode 14 can be mounted in polishing lap 12 such that a free surface 14A thereof maintains a spaced-apart juxtaposed relationship with surface 100A when polishing lap 12 is placed on surface 100A.

Electrolyte 16 is a liquid electrolyte (e.g., liquid solution, slurry with polishing media mixed therein, etc.) disposed between free surface 14A (of electrode 14) and surface 100A. The means and methods of providing electrolyte between electrode 14 and surface 100A can vary considerably without departing from the present invention. For example, surface 100A could simply be wetted with electrolyte 16 via surface immersion or surface spraying. Another option would be to provide an electrolyte reservoir (not shown) in polishing lap 12 that automatically drained into the region between electrode 14 and surface 100A. Regardless of the means/method used to provide electrolyte 16, its presence provides electrical conductivity between electrode 14 and (electrically-conductive or semi-conductive) material 100. In this way, when an electric potential is applied to electrode 14 and material 100 (e.g., as supplied by controller 18 in the illustrated example), current flows through material 100, electrolyte 16, and electrode 14.

The selection of electrolyte 16 and amount of current flowing through electrode 14/electrolyte 16 form the cornerstones for deterministic electrochemical shaping and polishing in accordance with the present invention. In general, electrolyte 16 must be formulated such that its electrochemical stability constant is indicative of an electrolyte that, due to chelation or ligand formation, will not support cathodic material deposition on electrode 14 when a current flows through electrode 14/electrolyte 16/material 100. Of course, since system 10 shapes and polishes surface 100A, electrolyte 16 must support the anodic dissolving of material 100 within an acceptable efficiency/rate. Ideally, electrolyte 16 achieves these ends while being safe for personnel and the environment. Accordingly, it is to be understood that the choice of a particular electrolyte is not a limitation of the present invention. However, by way of non-limiting examples, a few material 100/electrolyte 16 combinations are as follows:

| Material 100 | Electrolyte |
|---|---|
| Steel or nickel alloys | Citrate |
| | Pyrophospate |
| | Ethylene diamine tetracetic acid (EDTA) |
| Tungsten alloys | Sodium carbonate |
| | Potassium carbonate |
| Nickel iron alloys | Citric Acid |
| | Glycolic Acid |
| Nickel phosphorus | Citric Acid |
| | Citric acid with surfactants such as sodium laurel sulfate or phosphorus |

In the present invention, the amount of current flowing through material 100/electrolyte 16/electrode 14 is controlled in real-time such that Faraday's Law as it relates to the desired material removal is maintained. That is, the deterministic electrochemical material removal rate is achieved by satisfying or adhering to Faraday's Law which states that the removal of material is related directly to the current used, the molecular weight (MW) of the material being removed (i.e., material 100), time that the profiling current is applied, and inversely to the valence and Faraday's Constant (i.e., 96,500). More specifically, Faraday's Law states that the rate "R" of material removal is $R=(I*MW \times 3600)/V*96,500$ where "I" is current, and "V" is the valence. Note that area, material density, and valence of dissolution can be incorporated into this equation in order to develop a higher-precision material removal rate (e.g., on the order of nanometers per hour). For typical applications of the present invention, this means that the current I must be controlled to maintain a very low current density within the limiting current density for behavior within Faraday's Law on the portion of surface 100A that opposes free surface 14A of electrode 14.

The current flowing through material 100/electrolyte 16/electrode 14 can be a variable direct or alternating current. For example, for single phase materials, a variable direct current will generally be sufficient since material removal rates would be deterministic across surface 100A. However, when material removal rates differ across surface 100A as in the case of two or multiphase materials, an alternating current might be used. That is, multiphase materials can have a base material with grain boundaries or interstitial phases of differing hardness. Thus, it may be necessary to alter the rate of electrochemical shaping/polishing depending on the material composition or location on surface 100A.

As mentioned above, the present invention provides for deterministic shaping and polishing of surface 100A. To achieve this, controller 18 is provided with (i) a profile of surface 100A prior to shape/polish processing, and (ii) a desired profile that is to be achieved through the combination of mechanical and electromechanical shaping and polishing. Controller 18 uses the pre and post-processing profiles in conjunction with Faraday's Law to determine the profiling current necessary to electrochemically remove the required amount of material to achieve the desired surface profile. Controller 18 also employs well-known mechanical polishing laws (e.g., Preston's Law) that govern the relative movement between polishing lap 12 and surface 100A.

As would be understood by one of ordinary skill in the art, controller 18 can be realized by one or more components that operate to perform the various mechanical, electrical and processing operations described herein. Accordingly, it is to be understood that the particular apparatus used to provide these operations is not a limitation of the present invention.

Figure 2:
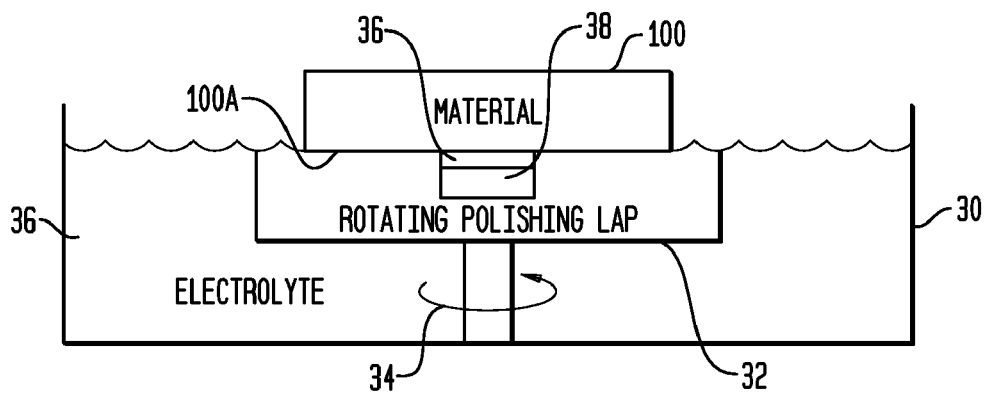
FIG. 2 is a schematic view of shaping and polishing system that uses a rotating polishing lap in an electrolyte bath in accordance with an embodiment of the present invention.

By way of non-limiting example, two possible system set-ups are presented schematically in FIGS. 2 and 3. In FIG. 2, a tub 30 mechanically supports a rotating and translating polishing lap 32 capable of rotation (as indicated by arrow 34) and translation. Tub 30 is filled with an electrolyte 36 satisfying the requirements described above. An electrode 38 is positioned in polishing lap 32. Material 100 is positioned so that its substantially planar surface 100A is wetted by electrolyte 36 when contacting polishing lap 32 as shown. In FIG. 3, a material 200 to be shaped and polished is in the form of a cylindrical mandrel that is supported on either end by a lathe 40 capable of rotating material 200 as indicated by arrow 42. A polishing lap 44 housing an electrode 46 is positioned above material 200. A reservoir 48 housing an electrolyte 50 is coupled to polishing lap 44 such that electrolyte 50 will wet surface 200A (e.g., via gravity feed, by means of a pump or sprayer, etc.) whenever polishing lap 44 is placed thereon. Polishing lap 44, electrode 46, and reservoir 48 form an assembly mounted on a linear positioner 52 that can move the assembly on/along material 200 while material 200 rotates.

Two examples utilizing the system/method of the present invention will be described briefly below. Example 1 utilized the system set-up shown in FIG. 2 and Example 2 utilized the system set-up shown in FIG. 3.

Example 1

An extremely hard and difficult to polish semi-conducting silicon carbide circular sample was first polished only in a mechanical fashion with aluminum oxide compound and a polyethylene pad along a specified ring for 20 hours. After this time, very little progress was measured using mechanical profilometry. Next, the set-up shown in FIG. 2 was employed where the electrolyte comprised of 10 grams per liter ammonium bi-fluoride, and a square wave current of about 15 mA average anodic current density was applied for 6 hours without a polishing compound. The concurrent shaping and polishing progress provided by the present invention was provided a ten-fold improvement over the purely mechanical polishing process.

Example 2

A nickel phosphorus coated aluminum optical component was ground to a near net shape with conventional grinding. After three weeks of pure mechanical polishing, the surface profile of the component was defined by curve 300 in FIG. 4. Next, the above described process of electrochemical and mechanical polishing and shaping rapidly and deterministically produced profile curve 302 utilizing the computer provided electrochemical etching current in combination with mechanical polishing. In this example, the electrolyte was 200 grams per liter citric acid, 10 grams per liter phosphorous acid, sodium hydroxide to pH 2.5, and 100 parts per million sodium laurel sulfate. The mechanical polishing media consisted of a rigid polyethylene pad on epoxy-fiberglass and a slurry of 0.05 micrometer alumina was mixed with the above electrolyte as the process proceeded. As is readily apparent, profile curve 302 generated by the present invention is nearly identical to the desired profile curve 304.

The advantages of the present invention are numerous. Combining mechanical and electrochemical shaping/polishing in a concurrent and deterministic fashion will provide a new level of precision and efficiency for the manufacturing of electrically-conductive and semi-conductive components. The approach utilizes simple and inexpensive devices thereby vastly improving the art of precision shaping and polishing.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A shaping and polishing system, comprising:
   first means adapted to mechanically shape and polish the surface of a material selected from the group consisting of electrically semi-conductive and conductive materials, said first means including a polishing lap adapted to be controllably positioned on the surface, said polishing lap being electrically non-conductive, said first means causing relative movement between said polishing lap and the surface;
   an electrode disposed in said polishing lap with said electrode adapted to be placed in spaced-apart juxtaposition with respect to the surface when said polishing lap is positioned on the surface;
   a liquid electrolyte disposed between the surface and said electrode, said electrolyte having an electrochemical stability constant such that cathodic material deposition on said electrode is not supported when a current flows through said electrode, said electrolyte and the material; and
   second means, adapted to be electrically coupled to the material and electrically coupled to said electrode, for causing said current to flow through said electrode, said second means adjusting said current based on (i) adherence to Faraday's Law, and (ii) a pre-processing profile of the surface and a desired post-processing profile of the surface, wherein the surface is deterministically shaped and polished as said polishing lap is controllably positioned on the surface.

2. A polishing system as in claim 1 wherein said first means moves said polishing lap relative to the surface.

3. A polishing system as in claim 1 wherein said first means is adapted to move the material relative to said polishing lap.

4. A polishing system as in claim 1 wherein said first means is adapted to move the material and move said polishing lap.

5. A polishing system as in claim 1 wherein said current is a direct current.

6. A polishing system as in claim 1 wherein said current is an alternating current.

7. A polishing system as in claim 1 wherein said current is controlled to produce a current density that maintains adherence to Faraday's Law on the portion of the surface that is in spaced-apart juxtaposition with said electrode.

8. A polishing system as in claim 1 further comprising a polishing media mixed with said electrolyte.

9. A system for shaping and polishing the surface of a material selected from the group consisting of electrically semi-conductive materials and conductive materials, said system comprising:
  an electrically non-conductive polishing lap adapted to be positioned on the surface of the material;
  an electrode disposed in said polishing lap with said electrode adapted to be placed in spaced-apart juxtaposition with respect to the surface when said polishing lap is positioned thereon;
  a liquid electrolyte disposed between the surface and said electrode, said electrolyte having an electrochemical stability constant such that cathodic material deposition on said electrode is not supported when a current flows through said electrode, said electrolyte and the material; and
  control means coupled to said polishing lap and said electrode for simultaneously (i) controllably positioning said polishing lap on the surface while causing relative movement between said polishing lap and the surface, and (ii) causing said current to flow through said electrode while adjusting said current based on (a) adherence to Faraday's Law, and (b) a pre-processing profile of the surface and a desired post-processing profile of the surface, wherein the surface is deterministically shaped and polished.

10. A system as in claim 9 wherein said control means moves said polishing lap relative to the surface.

11. A system as in claim 9 wherein said control means is adapted to move the material relative to said polishing lap.

12. A system as in claim 9 wherein said control means is adapted to move the material and move said polishing lap.

13. A system as in claim 9 wherein said current is a direct current.

14. A system as in claim 9 wherein said current is an alternating current.

15. A system as in claim 9 wherein said current is controlled to produce a current density that maintains adherence to Faraday's Law on the portion of the surface that is in spaced-apart juxtaposition with said electrode.

16. A system as in claim 9 further comprising a polishing media mixed with said electrolyte.

17. A method of shaping and polishing the surface of a material selected from the group consisting of electrically semi-conductive materials and conductive materials, said method comprising the steps of:
  providing an electrically non-conductive polishing lap with a conductive electrode disposed in a void formed in said polishing lap;
  positioning said polishing lap on the surface such that said electrode is placed in spaced-apart juxtaposition with respect to the surface;
  disposing a liquid electrolyte between the surface and said electrode, said electrolyte having an electrochemical stability constant such that cathodic material deposition on said electrode is not supported when a current flows through said electrode, said electrolyte and the material;
  controllably positioning said polishing lap on the surface while causing relative movement between said polishing lap and the surface; and
  causing said current to flow through said electrode while adjusting said current based on (i) adherence to Faraday's Law, and (ii) a pre-processing profile of the surface and a desired post-processing profile of the surface, wherein the surface is deterministically shaped and polished.

18. A method according to claim 17 wherein said step of causing relative movement comprises the step of moving said polishing lap relative to the material.

19. A method according to claim 17 wherein said step of causing relative movement comprises the step of moving the material relative to said polishing lap.

20. A method according to claim 17 wherein said step of causing relative movement comprises the step of moving the material and said polishing lap.

21. A method according to claim 17 wherein said current is a direct current.

22. A method according to claim 17 wherein said current is an alternating current.

23. A method according to claim 17 wherein said step of adjusting said current comprises the step of controlling said current to produce a current density that maintains adherence to Faraday's Law on the portion of the surface that is in spaced-apart juxtaposition with said electrode.

24. A method according to claim 17 further comprising the step of mixing a polishing media with said electrolyte.

* * * * *